Feb. 23, 1943. J. KALIX 2,311,666

DAM GATE

Filed Feb. 9, 1942

INVENTOR
John Kalix
BY
ATTORNEYS

Patented Feb. 23, 1943

2,311,666

UNITED STATES PATENT OFFICE 2,311,666

DAM GATE

John Kalix, Nashville, Tenn.

Application February 9, 1942, Serial No. 430,038

1 Claim. (Cl. 61—28)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in dam gates such as is described in my copending application Serial No. 425,508, filed January 3, 1942.

It is an object of this invention to provide an improved gate recess that will eliminate vibration and chattering as well as objectionable noise.

These and other objects of my invention will become apparent upon a consideration of the following description and the accompanying drawing, in which.

Figure 1:
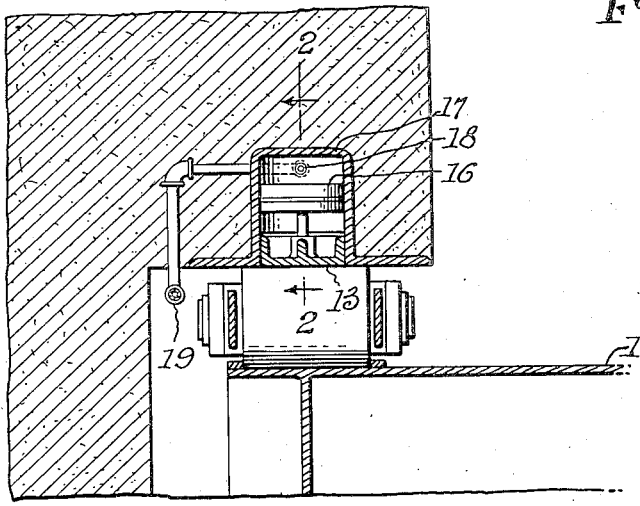
Figure 1 is a horizontal cross-section of the gate in the gate recess.
Figure 2:
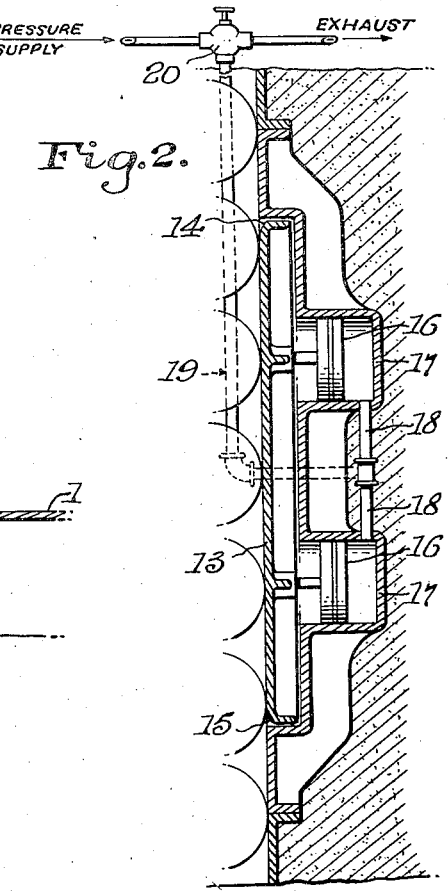
Fig. 2 is a vertical cross-section illustrating my improved chatter preventer.

Referring to Figs. 1 and 2, it will be seen that I have provided a guided flat bar 13 arranged within the gate recess and which is of sufficient length to overlap several rollers of the gate. The bar 13 is provided with rounded ends 14 and 15 and carries pistons 16 arranged to operate in cylinders 17 embedded in the upstream side of the gate recess. The pistons 16 are interconnected by pipes 18 to the main pipe 19, the top of which is above the water level and is connected to a three-way valve 20.

In operation, with the gate in its raised position, the valve 20 is turned to the exhaust position, relieving the pressure within the cylinders 17. The gate is then lowered and fluid under pressure admitted to the pipe 19, building up pressure within the cylinders 17 whereby the bar 13, through the action of the pistons 16, is forced against the gate, holding it firmly in place. The valve 20 may then be closed, maintaining the pressure in the cylinders 17. When it is desired to raise the gate, the valve 20 is opened to exhaust, relieving the pressure in the cylinders 17 and accordingly the pressure of the bar 13 against the gate, whereby it may be raised with a minimum of resistance. It is obvious that the valve 20 may be interconnected in any desired fashion with the hoisting mechanism so that its operation is automatic.

While I have illustrated a particular embodiment of my invention, it is to be understood tht I do not wish to be limited to the particular details and arrangement disclosed since various modifications within the spirit of the invention will suggest themselves to one skilled in the art.

Having described my invention, what I claim as new and wish to secure by Letters Patent is:

Gate locking mechanism for gates having anti-friction bearings comprising a guide bar arranged to contact a plurality of said bearings, a piston carried by said bar, and means to exert a pressure against the piston head, whereby said guide bar is caused to exert a pressure against the contacted gate bearings and to force the opposite bearings into contact with a side of the gate recess.

JOHN KALIX.